(12) United States Patent
Singh (10) Patent No.: US 9,837,203 B2
(45) Date of Patent: Dec. 5, 2017

(54) APPARATUSES HAVING DIFFERENT MODES OF OPERATION FOR INDUCTIVE WIRELESS POWER TRANSFER AND RELATED METHOD

(75) Inventor: Manjit Singh, Fremont, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 1088 days.

(21) Appl. No.: 13/434,658

(22) Filed: Mar. 29, 2012

(65) Prior Publication Data
US 2013/0257360 A1    Oct. 3, 2013

(51) Int. Cl.
    *H01F 38/14*        (2006.01)
    *H02J 7/00*         (2006.01)
    *H02J 7/02*         (2016.01)

(52) U.S. Cl.
CPC ............ *H01F 38/14* (2013.01); *H02J 7/0052* (2013.01); *H02J 7/025* (2013.01)

(58) Field of Classification Search
CPC ............ H01F 38/14; H02J 17/00; H02J 7/025
See application file for complete search history.

(56) References Cited

U.S. PATENT DOCUMENTS

| | | | |
|---|---|---|---|
| 4,953,068 A * | 8/1990 | Henze | H02M 3/33584 363/127 |
| 9,269,333 B2 | 2/2016 | Yu | |
| 9,343,929 B2 | 5/2016 | Sankar et al. | |
| 2006/0280297 A1 | 12/2006 | Fukaya | |
| 2008/0089519 A1 | 4/2008 | Ekberg | |
| 2008/0231211 A1 * | 9/2008 | Baarman | H02M 3/33523 315/294 |
| 2009/0261778 A1 * | 10/2009 | Kook | H02J 7/0044 320/108 |
| 2010/0084918 A1 * | 4/2010 | Fells | H02J 5/005 307/32 |
| 2010/0148723 A1 * | 6/2010 | Cook | G06K 7/0008 320/108 |

(Continued)

FOREIGN PATENT DOCUMENTS

WO    WO2012013129    *    2/2012    ............... H02J 7/00

OTHER PUBLICATIONS

Yu, WO2012013129, Terminal and Method for Charging and Discharging Thereof—description translation, Feb. 2012.*

(Continued)

*Primary Examiner* — Robert Grant
*Assistant Examiner* — Tynese McDaniel
(74) *Attorney, Agent, or Firm* — Haynes and Boone, LLP (57) ABSTRACT

An inductive wireless power enabled device may comprise a transceiver including a plurality of switches coupled with a resonant tank, and control logic configured to drive the plurality of switches to operate the resonant tank in one of a transmit mode and a receive mode. Another inductive wireless power enabled device may comprises a transceiver including a plurality of switches coupled with a resonant tank. The transceiver may be configured to both transmit a wireless power signal through the resonant tank and generate power from an incoming wireless power signal through the resonant tank depending on a current operational mode. A related method for operating a wireless power enabled device according to either a transmit mode or a receive mode is also disclosed.

23 Claims, 6 Drawing Sheets

(56) References Cited

U.S. PATENT DOCUMENTS

| | | | |
|---|---|---|---|
| 2011/0254377 A1* | 10/2011 | Wildmer et al. | B60L 11/182 307/104 |
| 2012/0043887 A1* | 2/2012 | Mesibov | H01F 38/14 315/76 |
| 2012/0119569 A1* | 5/2012 | Karalis | B60L 11/1812 307/9.1 |
| 2012/0119698 A1* | 5/2012 | Karalis | B60L 11/182 320/108 |
| 2012/0184338 A1* | 7/2012 | Kesler | H02J 17/00 455/572 |
| 2013/0127687 A1 | 5/2013 | Yu | |
| 2013/0147280 A1* | 6/2013 | Oettinger | H01F 38/14 307/104 |
| 2013/0257360 A1 | 10/2013 | Singh | |

OTHER PUBLICATIONS

International Search Report for PCT Application No. PCT/US2017/034549 Issued by the U.S. International Searching Authority on Aug. 7, 2017; Corresponding Ref.: No. 70107.458WO01 2828-WO; pp. 1-2.

Written Opinion for PCT Application No. PCT/US2017/034549 Issued by the U.S. International Searching Authority on Aug. 7, 2017; Corresponding Ref.: No. 70107.458WO01 2828-WO; pp. 1-6.

* cited by examiner

APPARATUSES HAVING DIFFERENT MODES OF OPERATION FOR INDUCTIVE WIRELESS POWER TRANSFER AND RELATED METHOD

FIELD

Embodiments of the present disclosure relate generally to inductive wireless power transfer and, more particularly, to apparatuses and related method for having different modes of operation for inductive wireless power transfer.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coil is one method considered as an un-tethered method for transferring power wirelessly through a coupled electromagnetic field. In inductive wireless power transmission, power is transferred by transmitting an electromagnetic field through a transmit coil. On the receiver side, a receiver coil may couple with the transmit coil through the electromagnetic field, thus, receiving the transmitted power wirelessly. The distance between the transmitter and receiver coils at which efficient energy transfer can take place, is a function of a coupling coefficient between the coils. The coupling efficiency may be significantly improved if the coils are sized and operated at such a frequency that they are physically within the so-called "near-field zone" of each other.

BRIEF SUMMARY

Embodiments of the present disclosure include an inductive wireless power enabled device. The inductive wireless power enabled device comprises a transceiver including a plurality of switches coupled with a resonant tank, and control logic configured to drive the plurality of switches to operate the resonant tank in one of a transmit mode and a receive mode.

Another embodiment of the present disclosure includes an inductive wireless power enabled device. The inductive wireless power enabled device comprises a transceiver including a plurality of switches coupled with a resonant tank. The transceiver is configured to both transmit a wireless power signal through the resonant tank and generate power from an incoming wireless power signal through the resonant tank depending on a current operational mode.

Another embodiment of the present disclosure includes a method for operating a wireless power enabled device. The method comprises determining a mode of operation for a wireless power enabled device from among a transmit mode and a receive mode, transmitting a wireless power signal through a resonant tank of the wireless power enabled device during the transmit mode, and generating an output power responsive to receiving an incoming wireless power signal through the resonant tank of the wireless power enabled device during the receive mode.

DETAILED DESCRIPTION

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Figure 1:
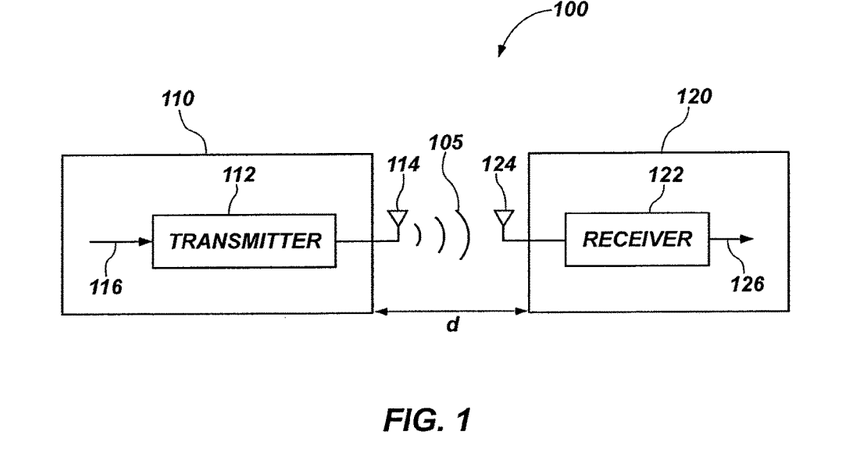
FIG. 1 is a schematic block diagram of an inductive wireless power transfer system.

FIG. 1 is a schematic block diagram of an inductive wireless power transfer system 100. The inductive wireless power transfer system 100 includes a wireless power transmitting apparatus 110, and a wireless power receiving apparatus 120. The wireless power transmitting apparatus 110 includes a transmitter 112 having a transmit coil 114 configured to generate an electromagnetic field 105 for providing energy transfer to the wireless power receiving apparatus 120. The wireless power receiving apparatus 120 includes a receiver 122 having a receive coil 124 configured to couple with the electromagnetic field 105. The transmit coil 114 and the receive coil 124 may be sized according to the particular devices and applications to be associated therewith. The electromagnetic field 105 may also be referred to as the wireless power signal 105 for energy transfer from the transmitter 112 to the receiver 122.

An input signal 116 may be provided to the transmitter 112 for providing the transmitter 112 with the power for generating the wireless power signal 105 that provides an energy transfer to the wireless power receiving apparatus 120. The receiver 122 may couple to the wireless power signal 105 and generates an output signal 126 in response thereto. The output signal 126 may provide the power that is used by the wireless power receiving apparatus 120 for storing (e.g., charging a battery), consumption (e.g., providing system power), or both.

The transmitter 112 and the receiver 122 are separated by a distance (d). In some embodiments, the transmitter 112 and the receiver 122 may be configured according to a mutual inductance relationship, such that when the resonant frequency of the receiver 122 and the resonant frequency of the transmitter 112 are substantially identical, transmission losses between the transmitter 112 and the receiver 122 are minimal. Likewise, the frequency of the wireless power signal 105 may be set by the transmitter 112 at or near the resonant frequencies of the coils 114, 124. As a result, an efficient energy transfer occurs by coupling a large portion of the energy in the near-field of the transmit coil 114 to the receive coil 124 rather than propagating most of the energy in an electromagnetic wave to the far-field. If the wireless power receiving apparatus 120 is in the near-field, inductive coupling may occur between the transmit coil 114 and the receive coil 124. The area around the transmit coil 114 and receive coil 124 where this near-field inductive coupling may occur may be referred to as a "coupling region."

The desired distance (d) separating the transmitter 112 and the receiver 122 may be a standard distance (e.g., 2 mm) that is determined by the Wireless Power Consortium (WPC). In some embodiments, the transmit coil 114 and the receive coil 124 may include magnetically attractive elements that assist in ensuring that the transmitter 112 and the receiver 122 remain at a known fixed distance (e.g., 2 mm) during wireless power transfer. In other words, employing a magnetically-guided topology that aligns the transmitter 112 and the receiver 122 may ensure that the transmitter 112 and the receiver 122 align within a relatively tight fixed vertical distance. For example, the transmitter 112 may include a magnet, while the receiver 122 may include an attractor (or vice versa).

The transmit coil 114 and the receive coil 124 may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 124 within a plane of the transmit coil 114 where the coupling region of the transmit coil 114 may be more powerful.

The wireless power transmitting apparatus 110 may be a wireless power charger. The wireless power receiving apparatus 120 may be a mobile electronic device, such as a cell phone, smart phone, media player (e.g., mp3 player, DVD player, etc.), electronic reader, tablet computer, personal digital assistant (PDA), camera, laptop computer, and personal electronic device in which wireless power may be received. The wireless power receiving apparatus 120 may also be a less mobile electronic device, such as a television, personal computer, media player (e.g., DVD player, Blu-ray player, etc.) or any other device that may operate by, and/or store electrical power. The wireless power receiving apparatus 120 may be one of a number of other items, such as an automobile or any other devices that may include batteries that may be charged through the wireless power transmitting apparatus 110.

The wireless power transmitting apparatus 110 may be a device that may, at times, also be the recipient of wireless power transfer. In other words, some devices may be configured as both a wireless power transmitting apparatus 110 and a wireless power receiving apparatus 120, such that the device may transmit wireless power or receive wireless power depending on the mode of operation. Thus, embodiments of the present disclosure include devices that may include a wireless charging transceiver configured to operate in either a transmit mode or a receive mode.

Figure 2:
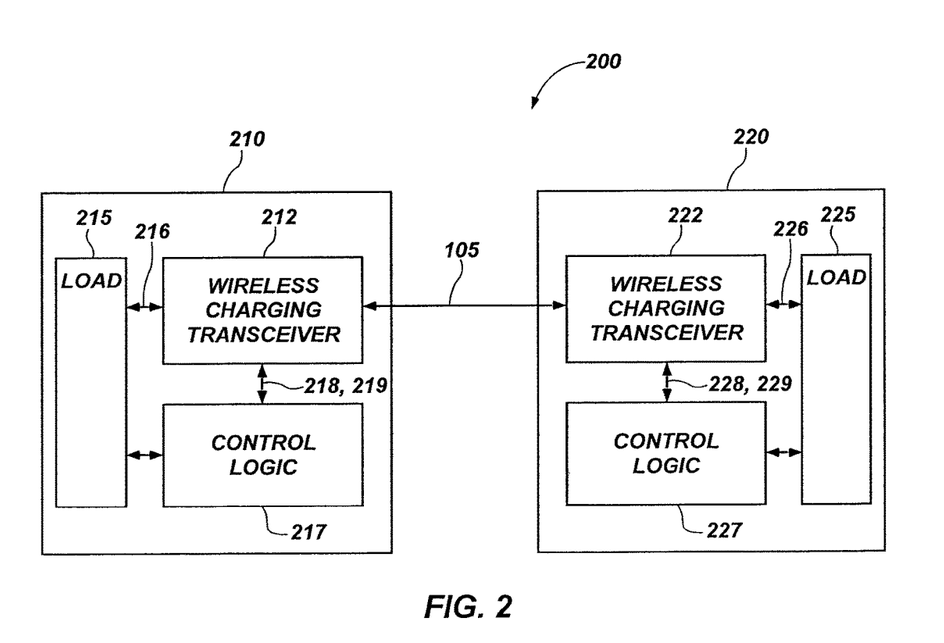
FIG. 2 is a schematic block diagram of an inductive wireless power transfer system according to an embodiment of the present disclosure.

FIG. 2 is a schematic block diagram of an inductive wireless power transfer system 200 according to an embodiment of the present disclosure. The inductive wireless power transfer system 200 includes a first wireless power enabled device 210 and a second wireless power enabled device 220. The first wireless power enabled device 210 may include a wireless charging transceiver 212, a load 215, and control logic 217. Similarly, the second wireless power enabled device 220 may include a wireless charging transceiver 222, a load 225, and control logic 227.

The first wireless power enabled device 210 and the second wireless power enabled device 220 may each be configured to either transmit or receive the wireless power signal 105 depending on its mode of operation. For example, the first wireless power enabled device 210 may be configured to have a transmit mode and a receive mode. In the transmit mode, the first wireless power enabled device 210 may generate the wireless power signal 105 for energy transfer another device. In the receive mode, the first wireless power enabled device 210 may receive the wireless power signal 105 and generate an output power signal 216 for a load 215. Likewise, the second wireless power enabled device 220 may be configured to have a transmit mode and a receive mode. In the transmit mode, the second wireless power enabled device 220 may generate the wireless power signal 105 for energy transfer another device. In the receive mode, the second wireless power enabled device 220 may receive the wireless power signal 105 and generate an output power signal 226 for a load 225. The control logic 217, 227 may be configured to determine which mode of operation the respective wireless power enabled device 210, 220 is desired to operate in. The control signals 218, 219, 228, 229 may be transmitted to the wireless charging transceivers 212, 222 to drive the desired operations.

As an example, the control logic 217, 227 may include a processor (e.g., microcontroller) that is configured (e.g., programmed) to determine whether the respective wireless charging transceiver 212, 222 is to operate in transmit mode or receive mode. The control logic 217, 227 may further include computer-readable media (e.g., memory) storing computing instructions for execution by the processor related to performing processes of the embodiments of the present disclosure. Memory may include volatile and non-volatile memory. The loads 215, 225 may include energy storage devices (e.g., batteries), system components of the wireless power enabled devices 210, 220, or both. Thus, the output power signals 216, 226 may be a charging signal for an energy storage device, or a system power signal for the various system components.

Because each of the wireless power enabled devices 210, 220 may be configured for either transmitting or receiving power, the wireless power enabled devices 210, 220 may be configured for wireless power "charging on the go" (OTG charging). For example, each of the wireless power enabled devices 210, 220 may be an electronic device (e.g., cell phone, tablet, laptop, etc.) that may provide power to, or receive power from, another electronic device (e.g., cell phone, tablet, laptop, etc.). Of course, a wireless power enabled devices that is configured for OTG charging may inductively couple with wireless power devices that are only configured for one-way charging. For example, the first wireless power enabled device 210 may operate in receive mode to receive the wireless power signal 105 generated from a wireless power transmitting apparatus that only operates in a transmit mode. Likewise, the first wireless power enabled device 210 may operate in transmit mode to generate the wireless power signal 105 for reception from a wireless power receiving apparatus that only operates in a receive mode.

In operation, each of the control logic 217, 227 determines which mode of operation the respective wireless power enabled device 210, 220 is desired to operate in. This determination may be performed according to a protocol that determines which wireless power enabled device 210, 220 is to operate in transmit mode and which is to operate in receive mode. In other words, the control logic 217, 227 determines the relationship between the wireless power enabled devices 210, 220. For example, the first wireless power enabled device 210 may include a software application that a user may interface with to manually establish the relationship between the first wireless power enabled device 210 and a nearby second wireless power enabled device 220. The first wireless power enabled device 210 may establish a communication link with the second wireless power enabled device 220 to establish the desired relationship. In another embodiment, the user may set (e.g., with a software application, a physical switch, etc.) the first wireless power enabled device 210 to operate in transmit mode, which then generates the wireless power signal 105. The second wireless power enabled device 220 may simply detect the presence of the wireless power signal 105 and automatically enter receive mode. As a result, a communication link between the wireless power enabled devices 210, 220 may not need to be established. In some embodiments, the wireless power enabled devices 210, 220 may further include a protocol that automatically establishes a desired relationship responsive to detecting each other's presence. For example, a protocol may be set to determine that the wireless power enabled device 210, 220 that has the higher remaining battery charge should operate in transmit mode. Other applications, features, and protocols for manually and automatically establishing a relationship between the wireless power enabled devices 210, 220 are also contemplated.

Figure 3A:
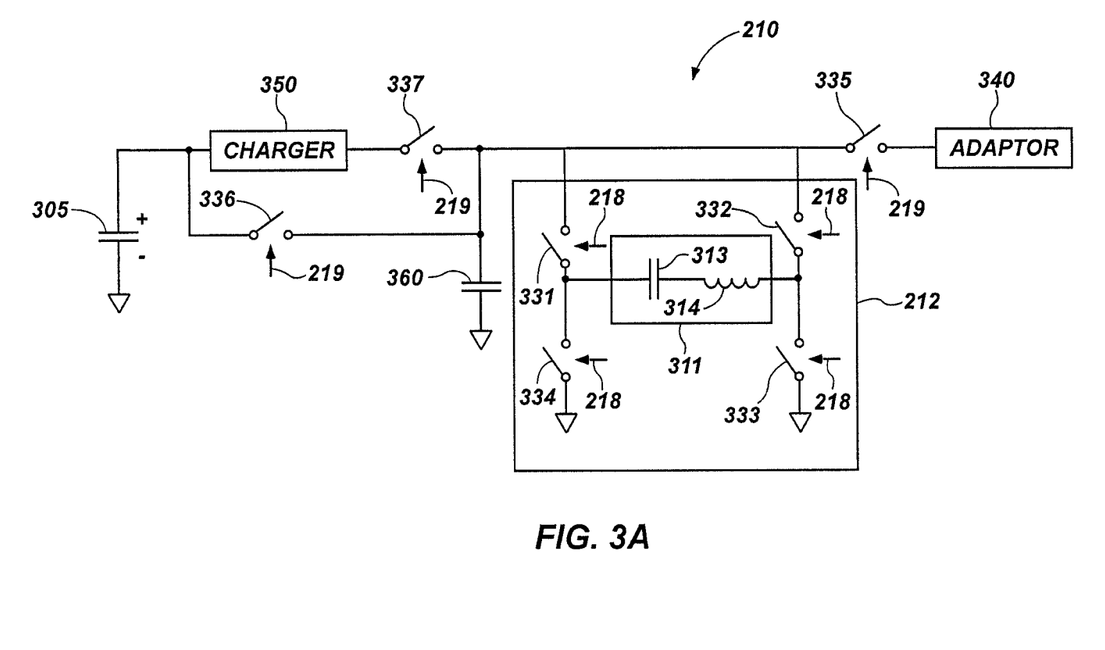
FIGS. 3A through 3D are schematic diagrams of a wireless power enabled device according to an embodiment of the present disclosure.

FIGS. 3A through 3D are schematic diagrams of a wireless power enabled device 210 according to an embodiment of the present disclosure. In particular, FIG. 3A shows a general configuration of at least some of the various components that may be present in the wireless power enabled device 210, while FIGS. 3B through 3D demonstrate the operation of the wireless power enabled device 210 for different modes of operation. The wireless power enabled device may be the first wireless power enabled device 210 of FIG. 2; however, it should be understood that the description and operation related to FIGS. 3A through 3D may apply to the second wireless power enabled device 220 as well.

Referring specifically to FIG. 3A, the wireless power enabled device 210 may include a wireless charging transceiver 212 that is coupled to an energy storage device 305. As discussed above, the energy storage device 305 may be included as part of the load 215 (FIG. 2) that receives the power from the wireless energy transfer. The wireless charging transceiver 212 may provide power to the energy storage device 305 through a charger 350 during receive mode. Although not specifically shown in FIGS. 3A through 3D, it is recognized that other system components of the wireless power enabled device 210 may receive power from the wireless charging transceiver 212, and that a path for system power may also be provided. The wireless charging transceiver 212 may receive power from the energy storage device 305 through the path parallel to the charger 350 to generate the wireless power signal 105 (FIG. 2) during transmit mode. In some embodiments, the wireless power enabled device 210 may receive power through non-wireless methods, such as being coupled with an adaptor 340 that may be plugged in to a traditional AC outlet. A plurality of switches 335, 336, 337 are coupled with the wireless charging transceiver 212 to control the power flow for the appropriate mode of operation. The plurality of switches 335, 336, 337 may be controlled by control signals 219 from the control logic 217 (FIG. 2).

The wireless charging transceiver 212 includes a resonant tank 311 that includes a capacitor 313 and an inductive coil 314. The capacitor 313 and inductive coil 314 may be configured in an LC network, such as being coupled in series (as shown) or in parallel. Additional capacitors and inductive coils may be included within the LC network of the resonant tank 311. The resonant frequency of the resonant tank 311 may be based on the inductance of the inductive coil 314 and the capacitance of the plates of the capacitor 313. If the resonant frequencies of the resonant tank 311 is substantially the same as the other inductively coupled device, the coupling efficiency and wireless power transfer may be improved.

The wireless charging transceiver 212 may include a plurality of switches 331, 332, 333, 334 that are controllable by the control signals 218 from the control logic 217 (FIG. 2). Thus, the control logic 217 may control the operation of the plurality of switches 331, 332, 333, 334 to operate in either a transmit mode or a receive mode. As a result, the inductive coil 314 may act as either a transmit coil or a receive coil depending on the mode of operation of the wireless power enabled device 210. Thus, during transmit mode, the wireless charging transceiver 212 may be configured to generate the wireless power signal 105 through the inductive coil 314 for providing energy transfer to a wireless power receiving apparatus. In receive mode, the wireless charging transceiver 212 may be configured to receive the wireless power signal 105 from a wireless power transmitting apparatus, such that a current is generated in the inductive coil 314 via inductive coupling.

The plurality of switches 331, 332, 333, 334 may be configured as a full-bridge circuit, such that the resonant tank 311 is coupled on one end at a node between the first switch 331 and the fourth switch 334, and at a node between the second switch 332 and the third switch 333 on the other end. In other words, the first switch 331 and the fourth switch 334 may be serially coupled having a first node therebetween, and the second switch 332 and the third switch 333 may be serially coupled having a second node therebetween. The resonant tank 311 may be coupled between the first node and the second node.

Figure 3B:
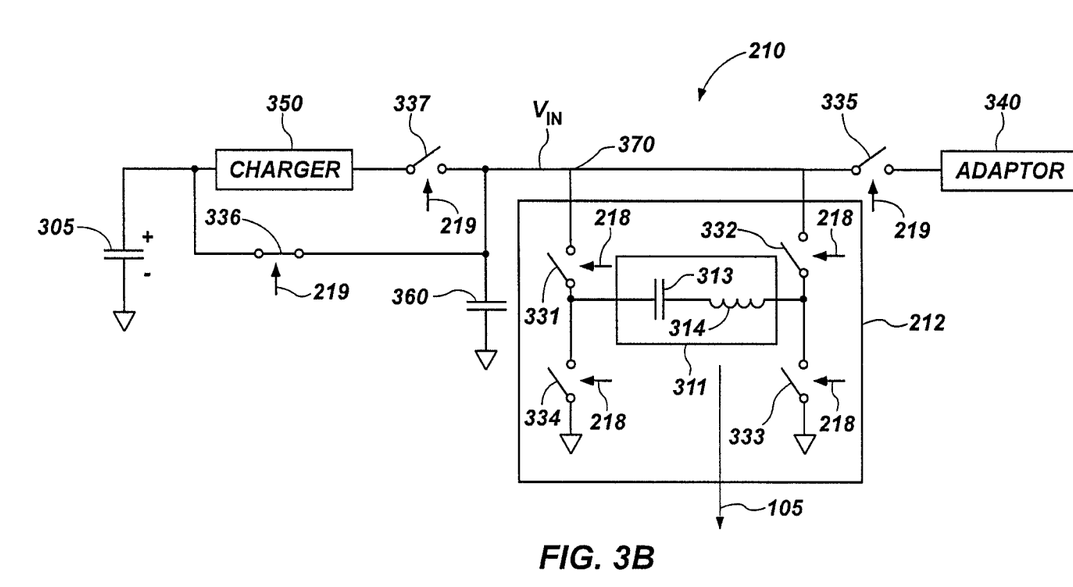

Referring now specifically to FIG. 3B, the wireless power enabled device 210 is shown as being operated in a transmit mode according to an embodiment of the present disclosure. In order to transmit wireless power, the control logic 217 (FIG. 2) may generate control signals 218 that operate the plurality of switches 331, 332, 333, 334 of the wireless charging transceiver 212 as a full-bridge inverter. As a result, the plurality of switches 331, 332, 333, 334 may open and close to generate an AC current through the resonant tank 311. For example, the control logic 217 may generate the control signals 218 to drive the plurality of switches 331, 332, 333, 334 to vary switching frequency, duty cycle of the switching, phase of the switching, the input voltage, or a combination thereof.

As a result, the AC current flowing through the resonant tank 311 may generate a time-varying electromagnetic field having for transmitting the wireless power signal 105 to a wireless power receiving apparatus. Thus, the wireless power signal 105 may be a time-varying signal that is substantially sinusoidal, having a frequency based on the switching frequency of the wireless charging transceiver 212. The control logic 217 may control the plurality of switches 331, 332, 333, 334 to cause the wireless power signal 105 to have a frequency that is approximately the resonant frequency of the resonant tank 311. In some embodiments, the frequency of the wireless power signal 105 may differ from the resonant frequency of the resonant tank 311, such as to reduce the peak to peak current through the inductive coil 314.

In this example, the power used to generate the wireless charging signal can be provided by the energy storage device 305 rather than through the adaptor 340. Thus, the fifth switch 335 may be open to disconnect the wireless charging transceiver 212 from the adaptor 340, and the sixth switch 336 may be closed to connect the energy storage device 305 to the wireless charging transceiver 212. In addition, the seventh switch 337 may be opened so that current may not flow through the charger 350 to the energy storage device 305. As a result, the voltage at node 370 may be the input signal ($V_{IN}$) to the wireless charging transceiver 212 for enabling current flow through the resonant tank 311 to generate the wireless power signal 105. Capacitor 360 may be coupled to node 370 may act as an input capacitor during transmit mode.

Figure 3C:
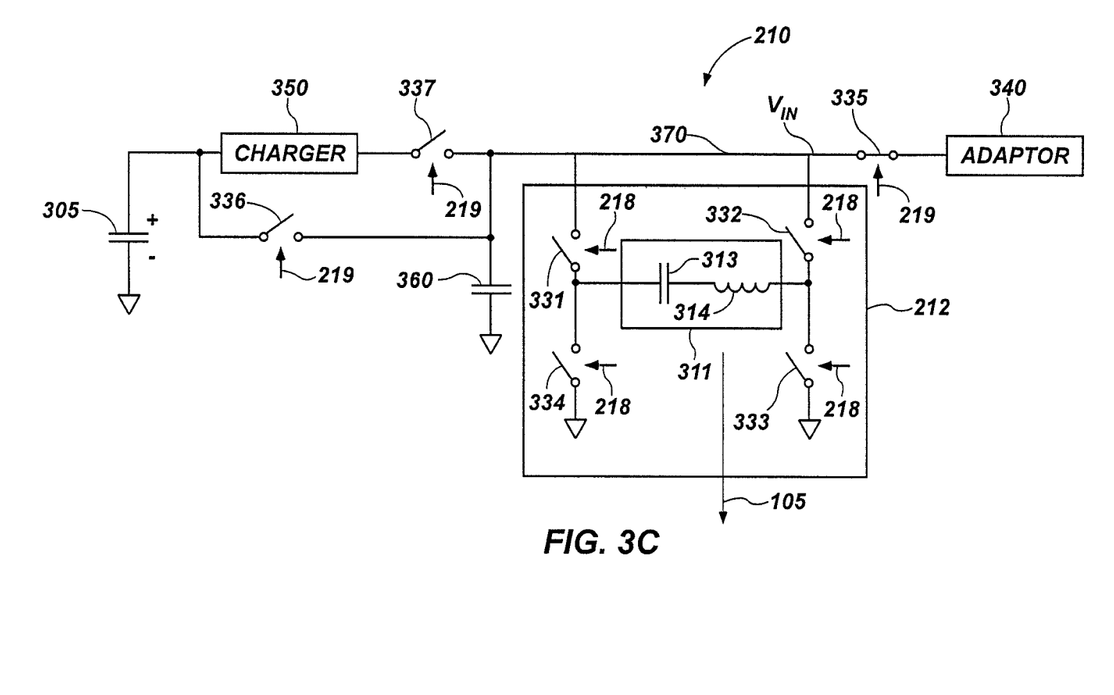

Referring specifically to FIG. 3C, the wireless power enabled device 210 is shown as being operated in a transmit mode according to another embodiment of the present disclosure. While in transmit mode, the control logic 217 (FIG. 2) and the wireless charging transceiver 212 may operate similar to that described with respect to FIG. 3B. In this example, however, the power used to generate the wireless charging signal is provided through the adaptor 340 rather than from the energy storage device 305 of the wireless power enabled device 210. For example, the wireless power enabled device 210 may be plugged into an AC outlet for receiving power while providing the wireless power signal 105 to another device. Thus, the fifth switch 335 may be closed to connect the wireless charging transceiver 212 and the adaptor 340, and the sixth switch 336 may be open to disconnect the energy storage device 305 to the wireless charging transceiver 212. In addition, the seventh switch 337 may be opened so that current may not flow through the charger 350 to the energy storage device 305. As a result, the voltage at node 370 may be the input signal ($V_{IN}$) to the wireless charging transceiver 212 for enabling current flow through the resonant tank 311 to generate the wireless power signal 105.

Figure 3D:
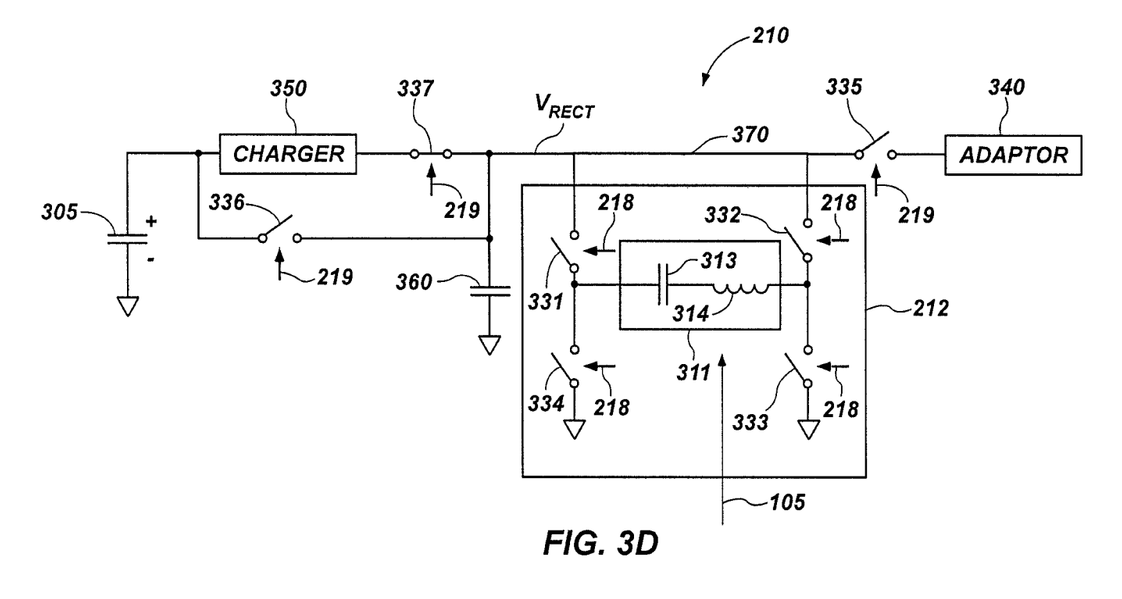

Referring specifically to FIG. 3D, the wireless power enabled device 210 is shown as being operated in a receive mode according to another embodiment of the present disclosure. In order to receive wireless power, the wireless power enabled device 210 may be placed in the coupling region of a wireless power transmitting apparatus such that inductive coupling may be achieved. As a result, the wireless charging transceiver 212 may receive the wireless power signal 105 and generate an AC current responsive thereto. In order for the power to be used by the wireless power enabled device 210, the AC current may be converted to a DC current. As a result, the control logic 217 (FIG. 2) may generate control signals 218 that operate the plurality of switches 331, 332, 333, 334 of the wireless charging transceiver 212 as a full-bridge rectifier. As a result, the plurality of switches 331, 332, 333, 334 may open and close to generate a DC current from the AC current flowing through the resonant tank 311. As a result, the voltage at node 370 is a rectified voltage ($V_{RECT}$) that is provided to the load 215 (FIG. 2), such as the energy storage device 305 (for charging), system components of the wireless power enabled device 210 (for system power), or a combination thereof.

The seventh switch 337 may be closed to connect the charger 350 and the wireless charging transceiver 212, such that power may be provided to the energy storage device 305 through the charger 350. The capacitor 360 may act as a filter capacitor during receive mode. The capacitor 360 and the charger 350 may be configured to further smooth the DC signal and set it to an appropriate DC voltage as a power output for use by the load 215 (FIG. 2). As discussed above, the load 215 may include system components such that the rectified voltage ($V_{RECT}$) is used to provide system power for the wireless power enabled device 210. The load 215 may also include an energy storage device 305 (e.g., battery) such that the rectified voltage ($V_{RECT}$) is used to provide the charging power for the energy storage device 305. Some embodiments may utilize the rectified voltage ($V_{RECT}$) to provide both system power and charging power simultaneously. The wireless charging transceiver 212 may be disconnected from receiving power from the energy storage device 305 and the adaptor 340 by opening the sixth switch 336, and the fifth switch 335, respectively.

The embodiments shown in FIG. 2, as well as in FIGS. 3A through 3D, are shown to demonstrate a wireless power enabled device being configured to operate in either a transmit mode or a receive mode, such as for wireless OTG charging. It should be recognized that the wireless power enabled device may include additional components to perform other features not specifically described herein. For example, the wireless power enabled device may include a modulator and/or a demodulator for communicating with other devices, foreign object detection modules, I/O modules for interfacing with a user, memory for storing instructions and data, various sensors, among other components.

Figure 4:
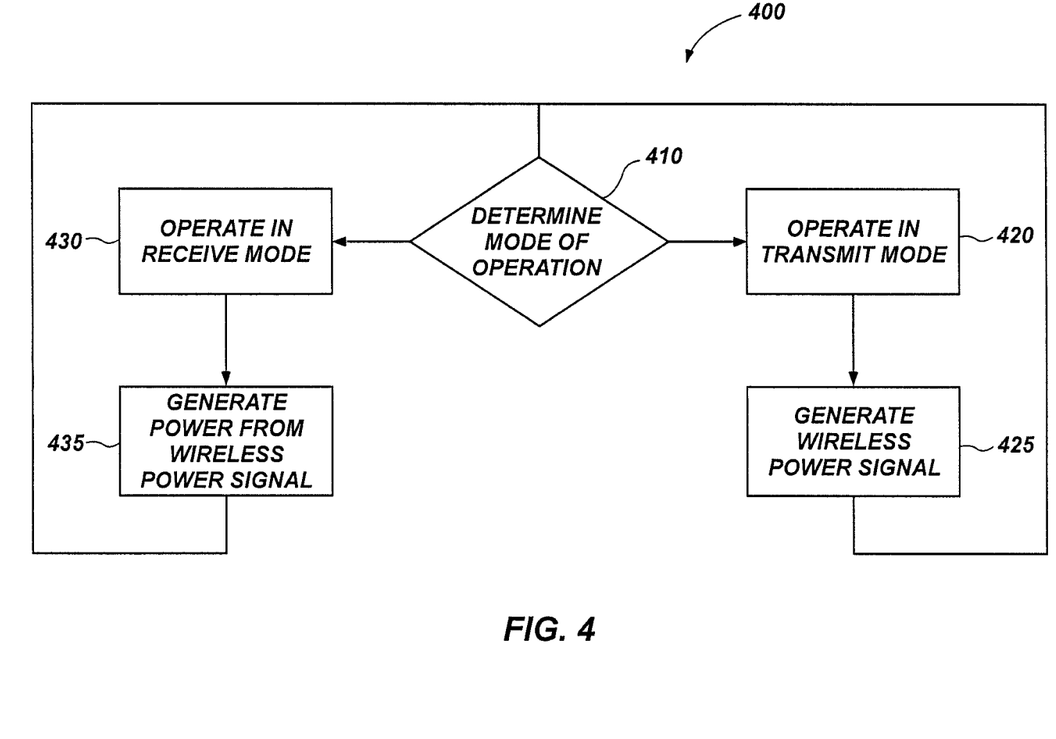
FIG. 4 is a flow chart illustrating a method for operating a wireless power enabled device according to an embodiment of the present disclosure.

FIG. 4 is a flow chart 400 illustrating a method for operating a wireless power enabled device according to an embodiment of the present disclosure. At operation 410, the mode of operation for the wireless power enabled device may be determined. For example, the wireless power enabled device may be configured to have a transmit mode and a receive mode. In some embodiments, the determination of which mode of operation is desired at a given time may be determined manually by a user. For example, the wireless power enabled device may include a software application or other feature (e.g., switch) for the user to interface with for the user to select which mode of operation is to be used for the wireless power enabled device. In some embodiments, the wireless power enabled device may automatically make the determination regarding the desired mode of operation. For example, the wireless power enabled device may detect an incoming wireless power signal and automatically enter a receive mode for receiving that wireless power signal. In some embodiments, the wireless power enabled device may make the determination based on communication with another device. For example, the wireless power enabled device may receive communication data from another device with instructions on which mode of operation the wireless power enabled device is desired for operation.

If the transmit mode is determined to be the desired mode of operation, the wireless power enabled operates in the transmit mode at operation 420. While in transmit mode, control logic may transmit control signals to a wireless charging transceiver. The control signals may control operation of a full-bridge circuit coupled with a resonant tank of the wireless charging transceiver to operate as a full-bridge inverter. The wireless charging transceiver operating as a full-bridge inverter receives a DC input signal and generates an AC current through the resonant tank. Therefore, at operation 425, the wireless power signal may be generated for energy transfer to a wireless power receiving device. The wireless power receiving apparatus may be an electronic device that is configured to receive the wireless power signal. In some embodiments, the wireless power receiving apparatus may likewise be a wireless power enabled device having multiple modes of operation.

If the receive mode is determined to be the desired mode of operation, the wireless power enabled operates in the receive mode at operation 430. While in receive mode, control logic may transmit control signals to the wireless charging transceiver. The control signals may control operation of the full-bridge circuit coupled with the resonant tank of the wireless charging transceiver to operate as a full-bridge rectifier. The wireless charging transceiver may receive an incoming wireless power signal and generate an AC current through the resonant tank through inductive coupling. The incoming wireless power signal may be generated by a wireless power transmitting apparatus, such as a wireless power charger. In some embodiments, the wireless power transmitting apparatus may likewise be a wireless power enabled device having multiple modes of operation.

The wireless charging transceiver operating as a full-bridge rectifier receives the AC current generated by the resonant tank generates a DC current to be output to a load. Therefore, at operation 435, power may be generated from the energy transfer to provide power to a load. For example, the load may include an energy storage device (e.g., battery), system components of the wireless power enabled device, or other power consuming devices.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A first inductive wireless power enabled device coupled to a first battery, comprising:
    a transceiver including a full-bridge circuit operable as a full-bridge inverter and a full-bridge rectifier, the full-bridge circuit including a plurality of first switches coupled in a full-bridge configuration with a resonant tank circuit, wherein the transceiver is coupled to the first battery through a second switch;
    a charger coupled between the transceiver and the first battery through a third switch, wherein the charger is arranged in parallel with the second switch; and
    control logic configured to:
        detect a presence of a second inductive wireless power enabled device coupled to a second battery;
        determine which of the first and second batteries has a higher remaining charge;
        while the first battery has the higher remaining charge, drive the plurality of first switches to operate the resonant tank circuit in a transmit mode, close the second switch, and open the third switch; and while the second battery has the higher remaining charge, drive the plurality of first switches to operate the resonant tank circuit in a receive mode, open the second switch, and close the third switch.

2. The first inductive wireless power enabled device of claim 1, wherein the control logic is configured to operate the full-bridge circuit as the full-bridge inverter during the transmit mode and as the full-bridge rectifier during the receive mode.

3. The first inductive wireless power enabled device of claim 1, wherein the resonant tank circuit includes at least one capacitor and at least one inductive coil of an LC network.

4. The first inductive wireless power enabled device of claim 3, wherein the at least one capacitor and the at least one inductive coil are serially coupled.

5. The first inductive wireless power enabled device of claim 1, further comprising a load operably coupled with the transceiver to receive power from the transceiver during the receive mode.

6. The first inductive wireless power enabled device of claim 5, wherein the load includes the first battery.

7. The first inductive wireless power enabled device of claim 5, wherein the load includes system components of the first inductive wireless power enabled device.

8. A first battery-powered inductive wireless power enabled device, comprising:
a transceiver including a full-bridge circuit operable as a full-bridge inverter and a full-bridge rectifier, the full-bridge circuit including a plurality of first switches coupled in a full-bridge configuration with a resonant tank circuit, wherein the transceiver is configured to drive the plurality of first switches to transmit a wireless power signal through the resonant tank circuit when operating in a transmit mode and generate power from an incoming wireless power signal through the resonant tank circuit when operating in a receive mode;
an energy storage device coupled to the transceiver through a second switch; and
a charger coupled between the transceiver and the energy storage device through a third switch, wherein the charger is arranged in parallel with the second switch, wherein:
the transceiver operates in the transmit mode, the second switch is closed, and the third switch is opened when, in a presence of a second battery-powered inductive wireless power enabled device, it is determined that the first battery-powered inductive wireless power enabled device has more remaining battery charge than the second battery-powered inductive wireless power enabled device; and
the transceiver operates in the receive mode, the second switch is opened, and the third switch is closed when, in the presence of the second battery-powered inductive wireless power enabled device, it is determined that the second battery-powered inductive wireless power enabled device has more remaining battery charge than the first battery-powered inductive wireless power enabled device.

9. The first battery-powered inductive wireless power enabled device of claim 8, wherein the charger is selected from the group consisting of a switching regulator and a linear regulator.

10. The first battery-powered inductive wireless power enabled device of claim 8, further comprising a mobile electronic device that includes the transceiver.

11. The first battery-powered inductive wireless power enabled device of claim 10, wherein the mobile electronic device is selected from the group consisting of a cell phone, a smart phone, a tablet computer, a laptop computer, an electronic reader, a personal digital assistant, a camera, and a media player.

12. The first battery-powered inductive wireless power enabled device of claim 8, wherein the plurality of first switches are configured to be independently driven by control signals to generate an AC current through the resonant tank circuit from a DC input signal during the transmit mode, and to generate a DC output signal from an AC current generated in the resonant tank circuit during the receive mode.

13. The first battery-powered inductive wireless power enabled device of claim 12, wherein the DC output signal, when generated, is received by the energy storage device.

14. The first battery-powered inductive wireless power enabled device of claim 13, wherein the DC output signal, when generated, flows through the charger via the third switch.

15. The first battery-powered inductive wireless power enabled device of claim 14, wherein closing the second switch enables the energy storage device to provide power to the transceiver during the transmit mode.

16. The first battery-powered inductive wireless power enabled device of claim 14, further comprising an adaptor port that is coupled with the transceiver through a fourth switch that enables an adaptor to provide power to the transceiver during the transmit mode.

17. A method for operating a first wireless power enabled device coupled to a first energy storage device through a first switch, the method comprising:
detecting a presence of a second wireless power enabled device coupled to a second energy storage device;
determining which of the first and second energy storage devices has a higher remaining charge;
while the first energy storage device has the higher remaining charge, operating the first wireless power enabled device in a transmit mode and closing the first switch, wherein during the transmit mode, a wireless power signal is transmitted through a resonant tank circuit of the first wireless power enabled device by operating a full-bridge circuit as a full-bridge inverter to transmit power; and
while the second energy storage device has the higher remaining battery charge, operating the first wireless power enabled device in a receive mode, opening the first switch, and closing a second switch to electrically couple the first wireless power enabled device to the first energy storage device through a charger arranged in parallel with the first switch, wherein during the receive mode, an output power signal is generated responsive to receiving an incoming wireless power signal through the resonant tank circuit of the first wireless power enabled device by operating the full-bridge circuit as a full-bridge rectifier to receive power.

18. The method of claim 17, wherein the outpt power signal, when generated, flows through the charger.

19. The method of claim 17, wherein the charger is selected from a group consisting of a switch regulator and a linear regular.

20. The method of claim 17, wherein wherein the resonant tank circuit includes at least one capacitor and at least one inductive coil of an LC network.

21. The method of claim 20, wherein the at least one capacitor and the at least one inductive coil are serially coupled.

22. The method of claim 17, wherein operating the full-bridge circuit as the full-bridge inverter includes driving a plurality of switches coupled with the resonant tank circuit during the transmit mode to generate an AC current through the resonant tank circuit.

23. The method of claim 22, wherein operating the full-bridge circuit as the full-bridge rectifier includes driving the plurality of switches coupled with the resonant tank circuit during the receive mode to receive an AC current generated by the resonant tank circuit and generate a DC current.

* * * * *